(12) United States Patent
Xuan et al.

(10) Patent No.: US 12,354,196 B2
(45) Date of Patent: Jul. 8, 2025

(54) CONTROLLABLE DIFFUSION MODEL BASED IMAGE GALLERY RECOMMENDATION SERVICE

(71) Applicant: Microsoft Technology Licensing, LLC, Redmond, WA (US)

(72) Inventors: Hong Xuan, Bellevue, WA (US); Li Huang, Sammamish, WA (US); Huangxing Li, Bellevue, WA (US); Xi Chen, Issaquah, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/214,559

(22) Filed: Jun. 27, 2023

(65) Prior Publication Data
US 2025/0005822 A1    Jan. 2, 2025

(51) Int. Cl.
*G06T 11/60* (2006.01)
*G06F 16/532* (2019.01)
(Continued)

(52) U.S. Cl.
CPC ............ *G06T 11/60* (2013.01); *G06F 16/532* (2019.01); *G06F 16/535* (2019.01); *G06T 7/13* (2017.01);
(Continued)

(58) Field of Classification Search
CPC ... G06T 11/60; G06T 7/13; G06T 7/73; G06T 2200/24; G06T 2207/20092; G06T 2207/30196; G06F 16/532; G06F 16/535
See application file for complete search history.

(56) References Cited

U.S. PATENT DOCUMENTS 11,769,239 B1 * 9/2023 Zhang .................... G06V 10/82
382/112
11,809,688 B1 * 11/2023 Parasnis .................... G06T 5/77
(Continued)

FOREIGN PATENT DOCUMENTS

CN    115935817 A    4/2023

OTHER PUBLICATIONS

"AI Art Generators—Ai Arts Lab", Retrieved from the Internet URL: https://web.archive.org/web/20220926152921/https://aiartslab.com/ai-art-generators-compare-the-best-ai-image-makers/#gs.c919b2, Sep. 26, 2022, pp. 1-30.
(Continued)

*Primary Examiner* — Matthew Ell
*Assistant Examiner* — Alvaro R Calderon, IV
(74) *Attorney, Agent, or Firm* — Cantor Colburn LLP; Renee D. Brown

(57) ABSTRACT

Aspects of the disclosure include methods and systems for leveraging a controllable diffusion model for dynamic image search in an image gallery recommendation service. An exemplary method can include displaying an image gallery having a plurality of gallery images and a dynamic image frame. The dynamic image frame can include a generated image and an interactive widget. The method can include receiving a user input in the interactive widget and generating, responsive to receiving the user input, an updated generated image by inputting, into a controllable diffusion model, the user input. The method can include replacing the generated image in the dynamic image frame with the updated generated image.

20 Claims, 11 Drawing Sheets

(51) Int. Cl.
  *G06F 16/535* (2019.01)
  *G06T 7/13* (2017.01)
  *G06T 7/73* (2017.01)

(52) U.S. Cl.
  CPC ............ *G06T 7/73* (2017.01); *G06T 2200/24* (2013.01); *G06T 2207/20092* (2013.01); *G06T 2207/30196* (2013.01)

(56) References Cited

U.S. PATENT DOCUMENTS

| | | | | |
|---|---|---|---|---|
| 11,893,713 | B1* | 2/2024 | Zhang | G06T 9/00 |
| 11,908,180 | B1* | 2/2024 | Ho | G06T 3/4053 |
| 11,922,541 | B1* | 3/2024 | Parasnis | G06T 7/11 |
| 11,922,550 | B1* | 3/2024 | Ramesh | G06F 40/30 |
| 11,928,319 | B1* | 3/2024 | Parasnis | G06N 3/0475 |
| 2016/0042252 | A1* | 2/2016 | Sawhney | G06F 16/5838 382/190 |
| 2018/0253869 | A1* | 9/2018 | Yumer | G06T 11/60 |
| 2022/0236863 | A1* | 7/2022 | Wilensky | G06T 5/50 |
| 2023/0067841 | A1* | 3/2023 | Saharia | G06T 3/4007 |
| 2023/0118966 | A1* | 4/2023 | Liu | G10L 13/02 345/473 |
| 2023/0177878 | A1* | 6/2023 | Sekar | G06F 40/40 382/103 |
| 2023/0214461 | A1* | 7/2023 | Brooks | G06Q 50/184 705/27.1 |
| 2023/0267652 | A1* | 8/2023 | Lupascu | G06T 11/00 345/428 |
| 2023/0325975 | A1* | 10/2023 | Zhi | G06T 5/50 |
| 2023/0334834 | A1* | 10/2023 | Bai | G06V 10/82 |
| 2023/0377214 | A1* | 11/2023 | Kansy | G06V 10/82 |
| 2023/0377226 | A1* | 11/2023 | Saharia | G06T 3/4053 |
| 2024/0037822 | A1* | 2/2024 | Aberman | G06T 11/60 |
| 2024/0062008 | A1* | 2/2024 | Ghosh | G06F 40/289 |
| 2024/0070816 | A1* | 2/2024 | Jandial | G06V 10/761 |

OTHER PUBLICATIONS

International Search Report and Written Opinion received for PCT Application No. PCT/US2024/031517, Aug. 16, 2024, 18 pages.
Tiago Ferreira, "ImageJ User Guide—IJ 1.46r Tools", Retrieved from the Internet URL: https://imagej.net/ij/docs/guide/146-19.html, Jun. 22, 2012, pp. 1-11.
Yang, et al., "Object matching with hierarchical skeletons", Pattern Recognition, vol. 55, Jul. 2016, pp. 183-197.

* cited by examiner

CONTROLLABLE DIFFUSION MODEL BASED IMAGE GALLERY RECOMMENDATION SERVICE

The subject disclosure relates to image search and recommendation systems, and particularly to leveraging a controllable diffusion model for dynamic image search in an image gallery recommendation service.

Image gallery recommendation systems (also referred to as visual or image based discovery systems) play an increasingly crucial role in modern applications across a number of different domains, including e-commerce, social media, and entertainment. The primary goal of an image gallery recommendation system is to predict and recommend one or more relevant images that a user is likely to find interesting or appealing. To achieve this, image gallery recommendation systems leverage a variety of techniques, such as collaborative filtering, content-based filtering, and deep learning, to provide personalized recommendations to users based on their characteristics, preferences, and behavior.

Collaborative filtering involves analyzing the prior behavior and preferences of similar users to make recommendations. By examining the historical data of users who have similar tastes and preferences to a given user, the image gallery recommendation can more accurately identify images that are likely to be of interest to the user. Collaborative filtering can be either item-based, user-based, or both, where the former focuses on similarities between items (images) and the latter focuses on similarities between users.

Content-based filtering refers to the analysis of the content and features of an image(s) themselves to make recommendations. Image gallery recommendation systems can extract relevant information from the images, such as color, texture, shape, and other visual attributes, and can use this extracted information to find similar images (using feature similarity, distance measures, etc.). By recommending images that are visually similar to the ones a user has already shown interest in, content-based filtering aims to capture the user's preferences based on image characteristics.

Deep learning techniques, such as convolutional neural networks (CNNs), Variational Autoencoders (VAEs), and transformer networks have revolutionized image recommendation systems. CNNs can learn intricate patterns and features (hierarchical representations) from images by processing them through multiple layers of interconnected neurons. By training on large datasets, these networks can capture complex relationships (local and global image features) and make accurate predictions about user preferences based on image content.

VAEs are generative models that can learn a compact representation (latent space) of input data. In the context of image recommendation, VAEs can learn a low-dimensional representation of images that captures the underlying structure and variations in the dataset. By leveraging this latent space, VAEs can generate new, diverse images that align with user preferences, enhancing the recommendation capabilities of an image gallery recommendation service.

Transformer networks were originally designed for natural language processing tasks but have found to excel in a range of other applications, such as in computer vision, including in image recommendation. Transformers model long-range dependencies and capture contextual information in data. In image gallery recommendation systems, transformer networks can be utilized to learn complex contextual relationships between images and to generate more accurate recommendations based on this contextual information.

Image gallery recommendation systems can also rely on user behavior data (user interactions) to enhance user satisfaction, engagement, and the overall user experience. In terms of user interaction, image gallery recommendation systems can offer several ways for users to engage with the system. For example, in implementations where a user(s) interacts with the image gallery recommendation system through a user interface, such as a mobile app or website, the user can be presented with an initial curated set of images. The user can then interact with the system by viewing images (e.g., scrolling through a collection of recommended images), liking/disliking images, saving images, sharing images (e.g., via a coupled social media platform), and/or otherwise interacting positively or negatively with one or more images in the gallery. These user interactions can be used as feedback to the system to better understand the user's tastes and to refine future recommendations.

It is important to note that while user interactions can play a significant role in training and refining image gallery recommendation systems, these interactions are somewhat limited-notably, users do not have direct control over the underlying algorithms and model parameters of an image gallery recommendation system. While a system can learn from aggregated user data to improve the recommendations for individual users and the overall user base, individual users typically only engage with the image gallery through a few defined pathways (viewing static images, clicking like/dislike, saving images, making comments about images, etc.). Unfortunately, these techniques have native limitations in capturing the full dynamics of user preferences.

SUMMARY

Embodiments of the present invention are directed to methods for leveraging a controllable diffusion model for dynamic image search in an image gallery recommendation service. A non-limiting example method includes displaying an image gallery having a plurality of gallery images and a dynamic image frame. The dynamic image frame can include a generated image and an interactive widget. The method can include receiving a user input in the interactive widget and generating, responsive to receiving the user input, an updated generated image by inputting, into a controllable diffusion model, the user input. The method can include replacing the generated image in the dynamic image frame with the updated generated image.

In some embodiments, the method includes receiving an image query in a field of the image gallery. In some embodiments, the generated image is generated by inputting, into the controllable diffusion model, the image query. In some embodiments, the plurality of gallery images and the generated image are selected according to a degree of matching to one or more features in the image query.

In some embodiments, the method includes determining one or more constraints in the image query. In some embodiments, the generated image is generated by inputting, into the controllable diffusion model, the one or more constraints.

In some embodiments, the one or more constraints in the image query include at least one of a pose skeleton and an object boundary. In some embodiments, determining the one or more constraints includes extracting the object boundary when a feature in the image query comprises one of a structure and a geological feature. In some embodiments, determining the one or more constraints includes extracting the pose skeleton when a feature in the image query comprises one of a person and an animal.

In some embodiments, the plurality of gallery images are sourced from an image database.

In some embodiments, the interactive widget includes a text field. In some embodiments, receiving the user input in the interactive widget includes receiving a text string input into the text field.

In some embodiments, the interactive widget includes one or more of a dropdown menu, a checkbox, a slider, a color picker, a canvas interface for drawing or sketching, and a rating button.

In some embodiments, the interactive widget includes a canvas for magic wand inputs. In some embodiments, receiving the user input in the interactive widget includes receiving a magic wand input graphically selecting one of a specific feature and a specific region in the generated image. In some embodiments, the interactive widget further includes a text field. In some embodiments, receiving the user input in the interactive widget further includes receiving a text string input having contextual information for the magic wand input.

Embodiments of the present invention are directed to systems for leveraging a controllable diffusion model for dynamic image search in an image gallery recommendation service. A non-limiting example system includes a memory having computer readable instructions and one or more processors for executing the computer readable instructions. The computer readable instructions control the one or more processors to perform various operations. The operations include receiving, from a client device communicatively coupled to the system, an image query. The operations include providing, to the client device, a plurality of gallery images and a generated image according to a degree of matching to one or more features in the image query. The operations include receiving, from the client device, a user input and generating, responsive to the user input, an updated generated image by inputting, into a controllable diffusion model, the user input. The operations include providing, to the client device, the updated generated image.

Embodiments of the present invention are directed to systems for leveraging a controllable diffusion model for dynamic image search in an image gallery recommendation service. A non-limiting example system includes a memory having computer readable instructions and one or more processors for executing the computer readable instructions. The computer readable instructions control the one or more processors to perform various operations. The operations include receiving, from an image gallery recommendation service communicatively coupled to the system, a plurality of gallery images and a generated image. The operations include displaying an image gallery having the plurality of gallery images and a dynamic image frame having the generated image and an interactive widget. The operations include receiving a user input in the interactive widget, transmitting the user input to the image gallery recommendation service, and receiving, from the image gallery recommendation service, an updated generated image. The operations include replacing the generated image in the dynamic image frame with the updated generated image.

The above features and advantages, and other features and advantages of the disclosure are readily apparent from the following detailed description when taken in connection with the accompanying drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
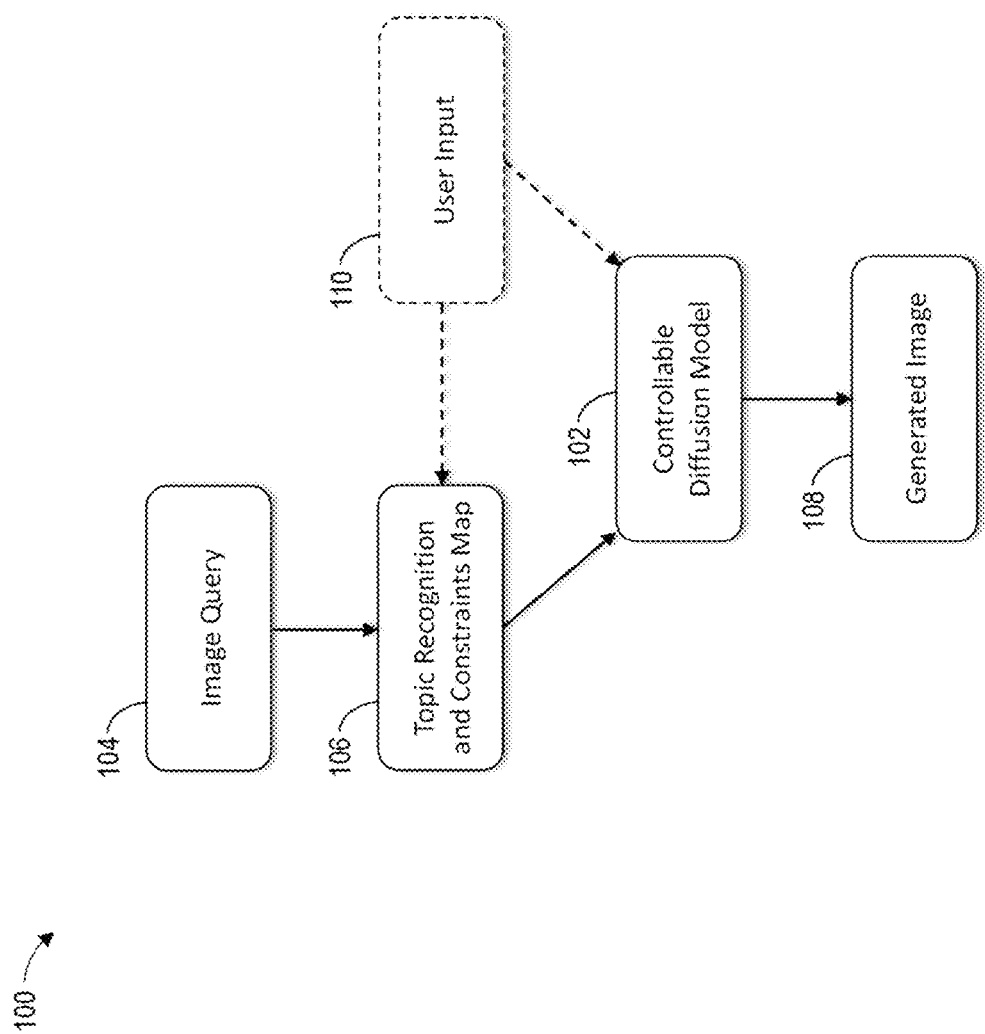
FIG. 1 depicts a block diagram for using a controllable diffusion model in accordance with one or more embodiments.

The diagrams depicted herein are illustrative. There can be many variations to the diagram or the operations described therein without departing from the spirit of the invention. For instance, the actions can be performed in a differing order or actions can be added, deleted or modified.

In the accompanying figures and following detailed description of the described embodiments of the invention, the various elements illustrated in the figures are provided with two or three-digit reference numbers. With minor exceptions, the leftmost digit(s) of each reference number corresponds to the figure in which its element is first illustrated.

DETAILED DESCRIPTION

Image gallery recommendation systems are used in various fields including e-commerce, social media, and entertainment to provide personalized recommendations to users. These systems use various techniques such as collaborative filtering, content-based filtering, and deep learning to recommend images to users. However, these techniques have native limitations in capturing the dynamics of user preferences. Typically, users only engage with these systems by viewing static images, clicking like/dislike on an image, saving images, and/or sharing and making comments about images.

This disclosure introduces the use of a so-called controllable diffusion model for dynamic image search in an image gallery recommendation service. Diffusion models refer to a class of generative models that leverage a diffusion process to generate high-quality synthetic data. Diffusion refers to the gradual spreading or dispersion of information or noise throughout a data space (e.g., an image) and the diffusion process in diffusion models involves iteratively transforming an initial noise vector into a sample by applying a sequence of diffusion steps. Each diffusion step adds controlled noise to the image while gradually reducing the noise level (the noise vector) in a way that progressively refines the generated image. By carefully controlling the noise process, diffusion models can generate high-quality images that exhibit convincing details. In the context of image recommendations, diffusion models can be utilized to generate realistic, abstract, synthetic, re-textured, artistic, etc., images from user prompts that are visually similar to the real images in a training dataset. For example, a diffusion model can create a novel watercolor painting of a sailboat on a river from the prompt "painting of sailboat and river in watercolor".

A "controllable" diffusion model refers to a type of diffusion model that can be dynamically guided and fine tuned post-image generation by additional user interactions. In some embodiments, for example, a controllable diffusion model is accessed via a dynamic image frame that includes an image (itself an output of the diffusion model) and an interactive widget that can be selected, edited, and/or otherwise manipulated by a user. In some embodiments, the interactive widget can receive inputs, such as text input, sketches, images, etc., from the user. In some embodiments, the controllable diffusion model can generate a new image and/or alter a previously generated image using the user inputs received via the interactive widget of the dynamic image frame as guidance. Continuing from the previous example, a controllable diffusion model can modify the generated watercolor painting of a sailboat on a river by replacing the sailboat with a motor boat in response to a user inputting, into the interactive widget, the additional text, "change the sailboat to a motorboat".

In some embodiments, the dynamic image frame and its respective image are positioned among a collection of other images (referred to herein as gallery images) within an overall image gallery as part of an image gallery recommendation service. The gallery images can include retrieved images (non-generated images) from an image database. In some embodiments, the retrieved images match an image query received from the user and/or are images matching one or more characteristics of the user. In this manner, a user can quickly navigate through the collection of images (both generated and retrieved) to find an image(s) of interest.

Advantageously, leveraging a controllable diffusion model for dynamic image search in an image gallery recommendation service in accordance with one or more embodiments enables a more natural, dynamic image search and image gallery experience for users. Unlike conventional diffusion models, which can frustrate users due to their native limitations, the controllable diffusion model and dynamic image frame described herein allow users to easily guide the output of the diffusion model within an image recommendation framework to achieve a resultant image that more closely mirrors the user's requirements. In short, the controllable diffusion model and dynamic image frame allows the user and diffusion model to collaboratively and iteratively interact in a straightforward process to progressively fine-tune a generated image(s) to the exact specifications of the user. The result is an image gallery recommendation service that efficiently produces highly relevant images in a cooperative and engaging manner with the user.

FIG. 1 depicts a block diagram 100 for using a controllable diffusion model 102 in accordance with one or more embodiments of the present invention. As shown in FIG. 1, an image query 104 is received by a topic recognition and constraints map 106. The image query 104 can be generated and/or otherwise sourced from an external system (e.g., a client device, refer to FIG. 2). The image query 104 (also referred to as a prompt) can include text as well as other types of input modalities as described previously. For example, the image query 104 might include the text string "show me paintings". In another example, the image query 104 might include a user-supplied sketch, stick-figure, etc. of a person or animal. In yet another example, the image query 104 might include the text string "retexture this in natural wood" in combination with an image of a metal chair.

In some embodiments, the topic recognition and constraints map 106 receives and processes the image query 104. In some embodiments, the topic recognition and constraints map 106 includes a module configured to identify the main subject(s) and/or theme(s) (collectively, the "topic") conveyed in the image query 104. Topic recognition helps the controllable diffusion model 102 to better understand the content and/or context of a prompt, which can ensure more relevant and coherent outputs. For example, by recognizing that the topic in a prompt is a birthday celebration, the controllable diffusion model 102 can tailor its response to align with the intended subject matter (showing, e.g., birthday cakes, candles, presents, etc.), resulting in a more accurate and meaningful output.

In the case of text prompts, topic recognition can involve analyzing the text to extract key information that represents the subject and/or themes of interest. In some embodiments, the topic recognition and constraints map 106 includes natural language processing (NLP) module(s) configured for NLP topic extraction, such as keyword extraction, named entity recognition, and/or topic modeling. These methods help identify important keywords, entities, or topics within a prompt.

For image prompts, topic recognition can involve analyzing the visual content to understand the objects, scenes, entities, and/or concepts depicted in the image. In some embodiments, the topic recognition and constraints map 106 includes visual processing (VP) module(s) configured for object detection, scene recognition, image captioning, and/or other techniques for extracting relevant information from visual input.

For audio prompts, including voice/speech data, topic recognition can involve applying automatic speech recognition (ASR) techniques with or without subsequent NLP methods to extract relevant information from the prompt. In some embodiments, the topic recognition and constraints map 106 includes ASR module(s) configured for transcribing audio input (e.g., spoken words) into text, preprocessing steps to clean and normalize the text data (e.g., this may involve removing punctuation, converting text to lowercase, and handling any specific text challenges related to the audio transcription process), and topic modeling, such as Latent Dirichlet Allocation (LDA) and Non-negative Matrix Factorization (NMF), to discover underlying themes and/or topics within the transcribed text.

Similar techniques can be used for topic recognition for other input modalities, and those provided herein are merely illustrative of the breadth of techniques available. Once the topic is recognized, the topic can be fed as input to the controllable diffusion model 102.

In some embodiments, the topic recognition and constraints map 106 includes a module configured to identify one or more constraints within the image query 104. Constraints provide additional information and/or limitations that need to be adhered to when generating the output and help ensure that the generated results will meet specific requirements or exhibit desired characteristics. Constraints can include, for example, two dimensional (2D) or three dimensional (3D) object boundary lines and pose skeletons. Other constraint types are possible.

Object boundary lines (both 2D and 3D) can be used as constraints to guide the generation of images with specific shapes or contours. For example, if a user wants to generate an image of a car, the user can provide a rough outline or boundary of the car as a constraint. In some embodiments, the controllable diffusion model 102 can extract this constraint and then utilize it to generate an image of a vehicle that aligns with the specified boundary lines.

Pose skeletons represent the underlying structure or arrangement of body parts in an image (e.g., a human figure). Pose skeletons can define the relative positions and orientations of various body parts (e.g., joints and limbs) of a figure(s) in an image. By extracting a pose skeleton as a constraint, the controllable diffusion model 102 can generate images that adhere to the specified pose.

Other constraint types include, for example, style constraints, contextual constraints, spatial constraints, and color constraints. Style constraints can specify a particular style, aesthetic, etc. that the user wants the generated output to exhibit. Contextual constraints capture a desired context to influence the generation process. Contextual constraints can include, for example, factors such as the time of day, weather conditions, the presence of a particular object(s) at a particular region(s) of an output image, etc. Spatial constraints are related to the spatial relationships among objects in an image. For example, a spatial constraint might specify the relative position of two objections within a scene (e.g., the chair is placed to the right of the person). Color constraints define the color(s) to be used in the generated output. This can include extracting specific colors as well as color palettes, dominant colors, and color distributions from a prompt.

Constraint identification involves recognizing and extracting the relevant constraints from the prompt and can vary depending on the type of constraints being used. For example, constraint identification can involve analyzing explicit annotations, understanding natural language descriptions, processing visual elements within the prompt, etc. Once the constraints are identified using the topic recognition and constraints map 106, the constraints can be incorporated into the generation process of the controllable diffusion model 102.

In some embodiments, the controllable diffusion model 102 receives the identified topic(s) and any constraints from the topic recognition and constraints map 106. In some embodiments, the controllable diffusion model 102 is configured to create a generated image(s) 108 from the topic(s) and constraints identified in the image query 104.

In some embodiments, the controllable diffusion model 102 further receives a user input 110. For example, the controllable diffusion model 102 can receive the user input 110 via an interactive widget of a dynamic image frame (refer to FIG. 2). The user input 110 can include, for example, text and/or other input modalities that represent and/or define additional constraints on the generated image(s) 108. For example, user input 110 might include the text "add more trees", which, in combination with an image query 104 including a scene having a few trees near a lake, can cause the controllable diffusion model 102 to create a generated image 108 having more trees near the lake. The user input 110 and the implementation of interactive midges are discussed in greater detail with respect to FIG. 2.

In some embodiments, the user input 110 is passed directly to the controllable diffusion model 102. In some embodiments, the user input 110 is passed to the controllable diffusion model 102 by way of the topic recognition and constraints map 106. For example, the topic recognition and constraints map 106 can identify one or more constraints within the user input 110 and can pass those constraints to the controllable diffusion model 102. In some embodiments, the user input 110 is passed both directly to the controllable diffusion model 102 and as additional constraints extracted by the topic recognition and constraints map 106.

Figure 2:
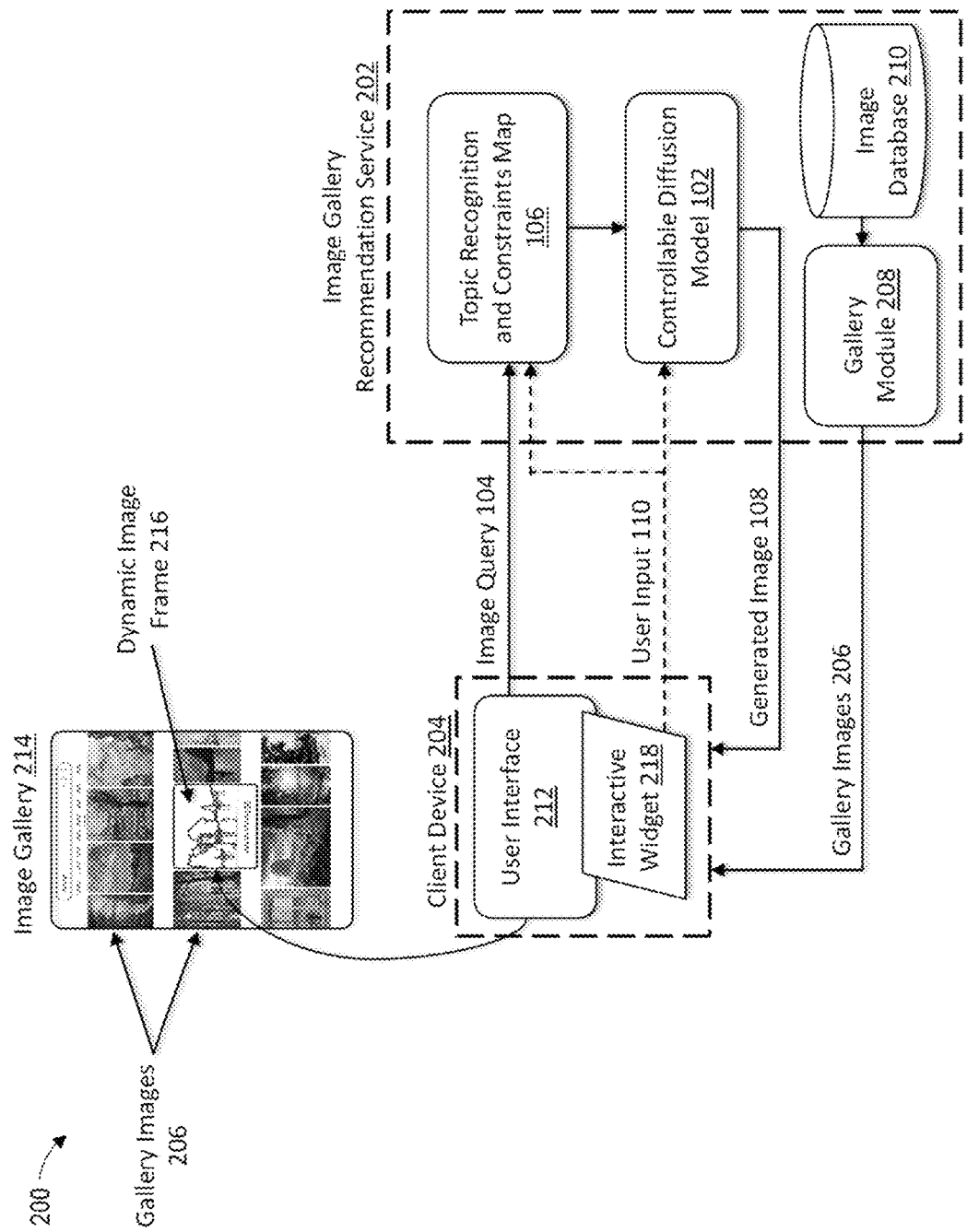
FIG. 2 depicts a block diagram for leveraging a controllable diffusion model for dynamic image search in accordance with one or more embodiments.

FIG. 2 depicts a block diagram 200 for leveraging a controllable diffusion model 102 for dynamic image search in accordance with one or more embodiments of the present invention. As shown in FIG. 2, the controllable diffusion model 102 (refer to FIG. 1 for additional internal details) can be incorporated within or as part of an image gallery recommendation service 202. Implementations for the image gallery recommendation service 202 are not meant to be particularly limited, but can include, for example, a remote or local server (or a service running on or with the server), an application (e.g., a web-based application) accessible through a browser and/or mobile device app, a content management system(s), etc. In some embodiments, the image gallery recommendation service 202 is an application and/or service integrated/embedded within another service or platform (e.g., within a social media platform, within a browser search page, etc.).

In some embodiments, the image gallery recommendation service 202 is accessed by a client device 204. The client device 204 is not meant to be particularly limited, but can include, for example, a personal computer (desktops, laptops, e-reader, etc.), a smartphone, a tablet, a smart home device, a wearable device (smartwatch, fitness tracker, etc.), a smart TV, a streaming device, a gaming console, a headset (virtual reality, augmented reality, etc.), and/or any other type of device used for consumer access to information streams.

In some embodiments, the client device 204 submits an image query 104 to the image gallery recommendation service 202 and receives, in response, one or more gallery images 206. In some embodiments, the gallery images 206 are sourced from a gallery module 208. The gallery module 208 can be incorporated within or in cooperation with the image gallery recommendation service 202. In some embodiments, the gallery module 208 retrieves one or more gallery images 206 from an image database 210. In some embodiments, the image database 210 includes a collection of images and the gallery module 208 is configured to select a subset of the collection of images responsive to the image query 104. In some embodiments, the images within the image database 210 are tagged or otherwise associated with metadata for retrieval. For example, images of horses can be tagged "animal", "horse", etc. In this manner, the image gallery recommendation service 202 can provide gallery images 206 relevant to the image query 104. For example, the image gallery recommendation service 202 can retrieve various images of paintings from the image database 210 responsive to the image query 104 "show me paintings".

In some embodiments, the client device 204 include a user interface 212 configured to display an image gallery 214. In some embodiments, the client device 204 and/or the image gallery recommendation service 202 configures the image gallery 214 to graphically display the gallery images 206 within the user interface 212. In this manner, the image gallery recommendation service 202 can offer one or more recommended images to a user within the context of an image search.

In some embodiments, the client device 204 submits an image query 104 to the image gallery recommendation service 202 and receives, in response, the generated image 108 alongside the one or more gallery images 206. In some embodiments, the client device 204 and/or the image gallery recommendation service 202 configures the image gallery 214 to graphically display the generated image 108 alongside the gallery images 206. In some embodiments, the image gallery 214 includes a dynamic image frame 216 that displays the generated image 108. In some embodiments, the user interface 212 and/or the dynamic image frame 216 includes an interactive widget 218. In some embodiments, the interactive widget 218 includes a user-interactable field and/or buttons within which a user can provide the user input 110. In this manner, the image gallery recommendation service 202 can offer a more dynamic image search experience, as described in greater detail herein.

The user-interactable fields and/or buttons of the interactive widget 218 are not meant to be particularly limited. In some embodiments, the interactive widget 218 includes a text input field (refer to FIG. 3). A text input field allows users to enter user input 110 (e.g., textual prompts or instructions) directly into the dynamic image frame 216. Users can type in keywords, descriptions, and/or specific requests to guide the controllable diffusion model 102 image generation process. In some embodiments, the interactive widget 218 includes one or more dropdown menus. Dropdown menus can provide a list of predefined options for users to select from for fine-tuning their images. These options can include, for example, pre-determined categories, styles, and/or other attributes that users can choose to fine-tune their prompt (the image query 104). For example, a dropdown menu might include the option to "decolor", "restyle", etc. In some embodiments, the interactive widget 218 includes one or more checkboxes. Checkboxes allow users to select one or more options from a predefined list and can be used to specify certain preferences, constraints, and/or features that should be incorporated in the generated image 108. For example, checkboxes might include options for retaining particular features/elements found by the topic recognition and constraints map 106 (e.g., check this option to retain people in the background of the image, etc.). In some embodiments, the interactive widget 218 includes one or more sliders. Sliders enable users to adjust a value(s) within a range by dragging a slider handle. Sliders can be used to capture continuous preferences or numerical constraints, such as controlling the level of detail, intensity, and/or size of any feature in the generated image 108. For example, a slider can allow a user to dynamically scale (increase or decrease in size) an object (e.g., the moon, a building, etc.) in the generated image 108. In some embodiments, the interactive widget 218 includes a color picker. Color Pickers allow users to choose specific colors by selecting them from a color palette and/or by selecting color codes and can be useful for specifying color preferences or constraints for the generated image 108. In some embodiments, the interactive widget 218 includes a drawing or sketching interface or canvas. Drawing or sketching interfaces can enable users to create or modify visual inputs within the dynamic image frame 216 using a pen, mouse, touch input, and/or stylus. For example, users can draw object outlines, sketch poses, and provide other visual cues within the interactive widget 218. In some embodiments, the interactive widget 218 includes one or more rating buttons to allow users to express their preferences or opinions on a numerical or relative scale. Rating buttons allow users to rate specific attributes, such as the quality, style, and relevance of the generated output. For example, the interactive widget 218 can include rating buttons for "I like this" and "I don't like this" to further fine-tune the generated image 108.

Notably, the interactive widget 218 can be configured to receive a variety of input types. In some embodiments, the interactive widget 218 can receive one or more (even mixed) multimodal inputs including, but not limited to, text data (e.g., natural language sentences, documents, transcripts, etc.), image data (visual representations, drawings, sketches, photographs, etc.), video data (e.g., Sequential frames of images with and without accompanying audio), audio data (e.g., sound recordings, music, speech, and other forms audio signals, etc.), sensor data (e.g., data collected from sensors, such as temperature sensors, accelerometers, GPS devices, environmental sensors, etc.), gestures (e.g., physical movements and gestures captured through devices like motion sensors and depth cameras, etc.), metadata (e.g., descriptive and/or contextual information associated with other modalities, such as timestamps, user demographics, location data, etc.), structured data (e.g., tabular data or otherwise structured data formats, including numerical data, categorical variables, relational databases, etc.), emotive data (e.g., information related to emotional states, expressions, and sentiment, which can be expressed and inferred through text, audio, tone, facial expressions, etc.), biometric data (e.g., physical and physiological data of individuals, such as fingerprints, iris scans, heart rate, brainwave patterns, etc.), and social data (e.g., data related to social interactions, social networks, and social graphs, capturing connections, relationships, and communication patterns between individuals, etc.).

In some embodiments, the interactive widget 218 can receive so-called magic wand inputs, which refer to a user interface technique that allows users to graphically select or otherwise indicate specific features and/or regions in an image as more or less desirable. The magic wand style user input can then be used to guide the fine-tuning or update process of the controllable diffusion model 102 to emphasize and/or remove certain features in the generated image 108. In some embodiments, users can use a brush tool or other type of selection tool within the dynamic image frame 216 to mark the regions or features of an image (e.g., an initially generated image 108) that the user wants to enhance, remove, or otherwise change. In effect, the marked regions or features act as a guidance signal for the controllable diffusion model 102, indicating areas that should be emphasized or suppressed during the update process. Leveraging a magic wand style technique in this manner allows users to have more precise control over the output of the controllable diffusion model 102, enabling them to better customize or personalize the generated image 108 based on their unique preferences.

In some embodiments, the interactive widget 218 can receive combinations of multimodal input. For example, in some embodiments, the interactive widget 218 can receive textual data as well as magic wand style selections. To illustrate, consider a generated painting of a sailboat (or a motorboat, etc.) on a river. In some embodiments, a user can use the interactive widget 218 to provide a magic wand selection of a riverbank region adjacent the river as well as the textual input "add trees" or "add buildings", etc. In some embodiments, the controllable diffusion model 102 can update the generated image 108 using the inputs received via the interactive widget 218. Continuing with this example, the painting of the sailboat can be altered to add (or remove) trees and buildings next to the river. In another example, a user can use a magic wand to circle a feature, such as a cloud in a painting, along with a text input for "larger" (or manipulating a size slider) to cause the controllable diffusion model 102 to change (enlarge) the cloud. Other combinations of multimodal input are possible (e.g., gesture data combined with audio data, textual data with biometric data, textual data, magic wand inputs, and gestures, etc.) and all such configurations are within the contemplated scope of this disclosure.

An exhaustive list of every possible interaction and configuration for the interactive widget 218 is omitted for clarity. However, it should be understood that the provided examples are generally illustrative of the dynamic generative image process between a user and an image gallery afforded by the interactive widget 218 and controllable diffusion model 102. Other configurations (types of user prompts, selection of multimodal inputs, input scope, number of nested fine-tuning inputs, types of interactive buttons, sliders, dialog boxes, etc.) are possible using the interactive widget(s) 218 and all such configurations are within the contemplated scope of this disclosure.

Figure 3:
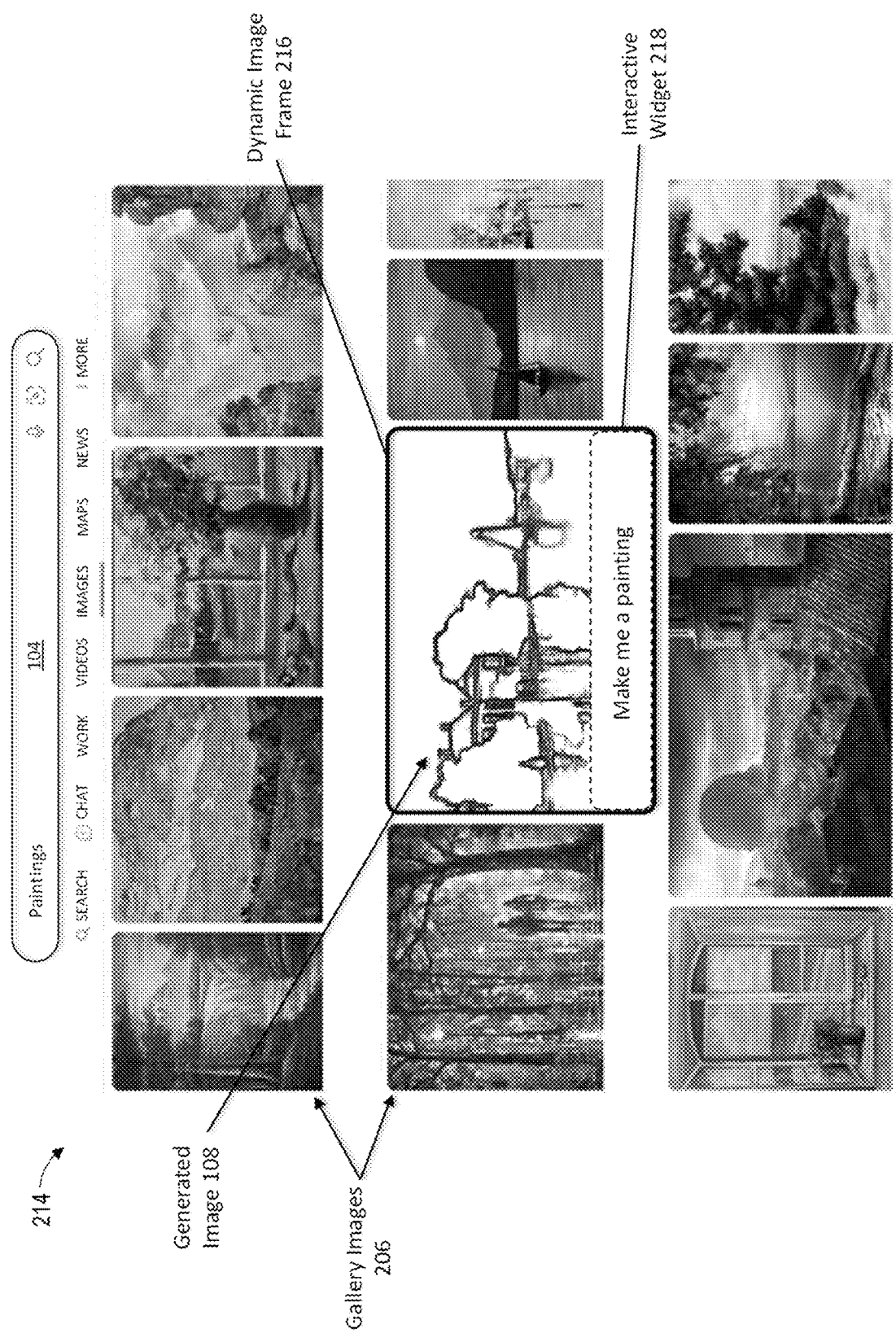
FIG. 3 depicts an example image gallery in accordance with one or more embodiments.

FIG. 3 depicts an example image gallery 214 in accordance with one or more embodiments of the present invention. The image gallery 214 can be presented to a user in a user interface (e.g., the user interface 212 in FIG. 2). As shown in FIG. 3, the image gallery 214 can include an image query 104 (here, the string "Paintings"), one or more gallery images 206 (here, a collection of paintings), and a dynamic image frame 216. The image gallery 214 is shown having a single dynamic image frame 216 and a specific number (here, 11) and arrangement of gallery images 206 for ease of discussion only and is not meant to be particularly limited. The image gallery 214 can include any number of dynamic image frames 216 and gallery images 206 arranged arbitrarily as desired. In some embodiments, the gallery images 206 and the generated image 108 are retrieved and/or created in response to the image query 104 using an image gallery recommendation service 202 (refer to FIG. 2). In some embodiments, the gallery images 206 are populated from a database (e.g., image database 210). In some embodiments, the generated image 108 is created dynamically using the controllable diffusion model 102 (refer to FIGS. 1 and 2).

In some embodiments, the dynamic image frame 216 includes a generated image 108 (here, a painting sketch of a sailboat near buildings) and an interactive widget 218 (here, a selectable button having the pre-generated text "Make me a painting"). The configuration of the dynamic image frame 216 and interactive widget 218 is shown for illustrative purpose only and can include any number of additional aspects or features described herein (e.g., sliders, canvas areas, checkboxes, pull-down menus, etc.).

In some embodiments, the pre-generated text of the interactive widget 218 can be generated from the image query 104. In some embodiments, the image query 104 can be provided to an image gallery recommendation service 202 having a topic recognition and constraints map 106 configured to identify a topic of interest within the image query 104 (using, e.g., NLP, etc. as described previously). In some embodiments, the pre-generated text includes the identified topic. For example, for an image query 104 for "Paintings" the interactive widget 218 can include the pre-generated text "Make me a painting" (as shown).

Figure 4:
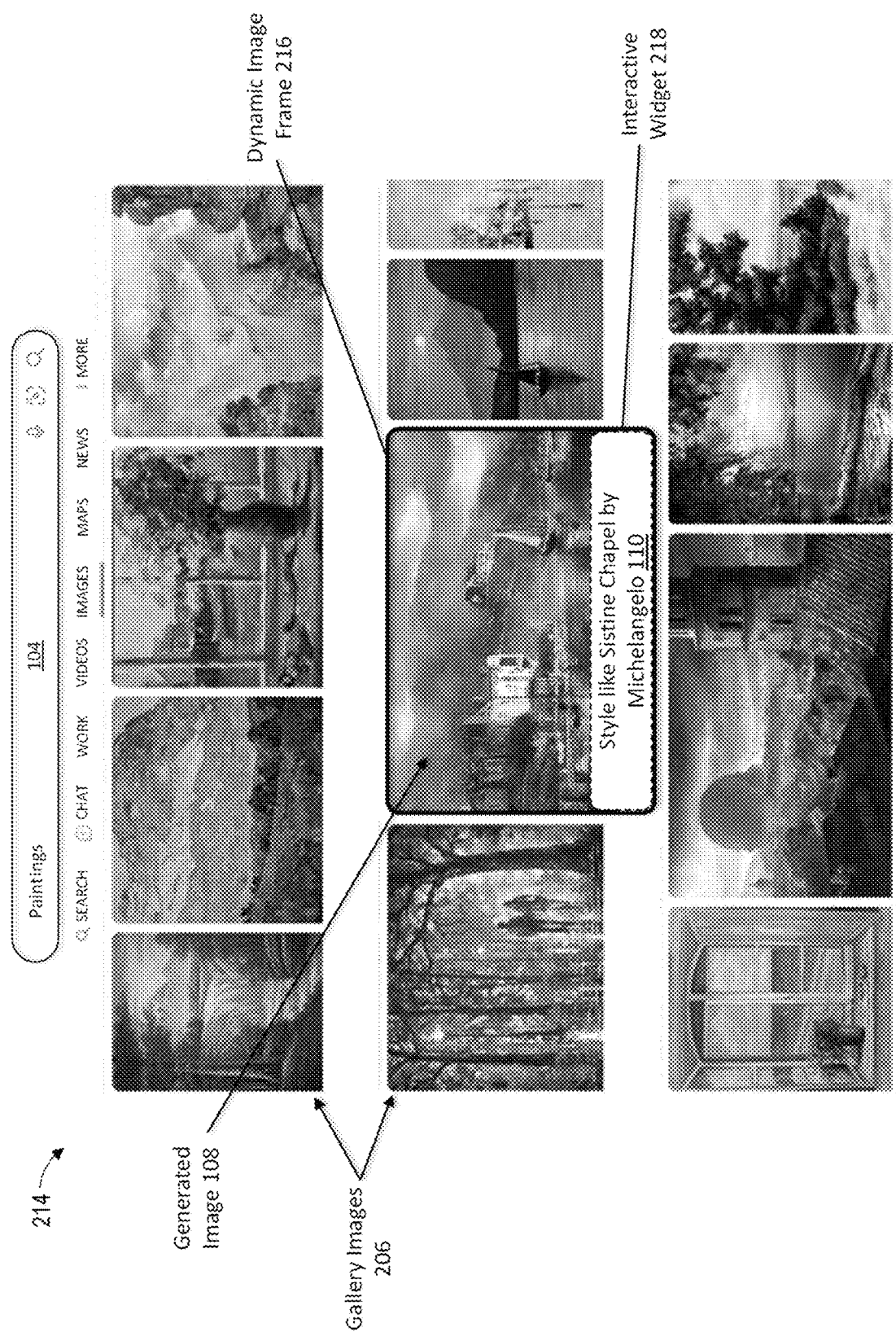
FIG. 4 depicts the example image gallery of FIG. 3 after a user interaction in accordance with one or more embodiments.

FIG. 4 depicts the example image gallery 214 of FIG. 3 after a user clicks or otherwise selects the interactive widget 218 having the pre-generated text "Make me a painting" in accordance with one or more embodiments of the present invention. As shown in FIG. 4, the generated image 108 in the dynamic image frame 216 has changed to a new, dynamically generated painting. In some embodiments, the new, dynamically generated painting includes a more fully fleshed out image based on the earlier painting sketch. Observe that the painting still includes a sailboat near buildings, but additional details, textures, and elements have been added to provide a more finished appearance reassembling that of an actual painting.

In some embodiments, the pre-generated text (refer to FIG. 3) of the interactive widget 218 can be overwritten by user input 110. For example, a user can enter the string "Style like Sistine Chapel by Michelangelo" into the interactive widget 218 (via, e.g., a text field).

Figure 5:
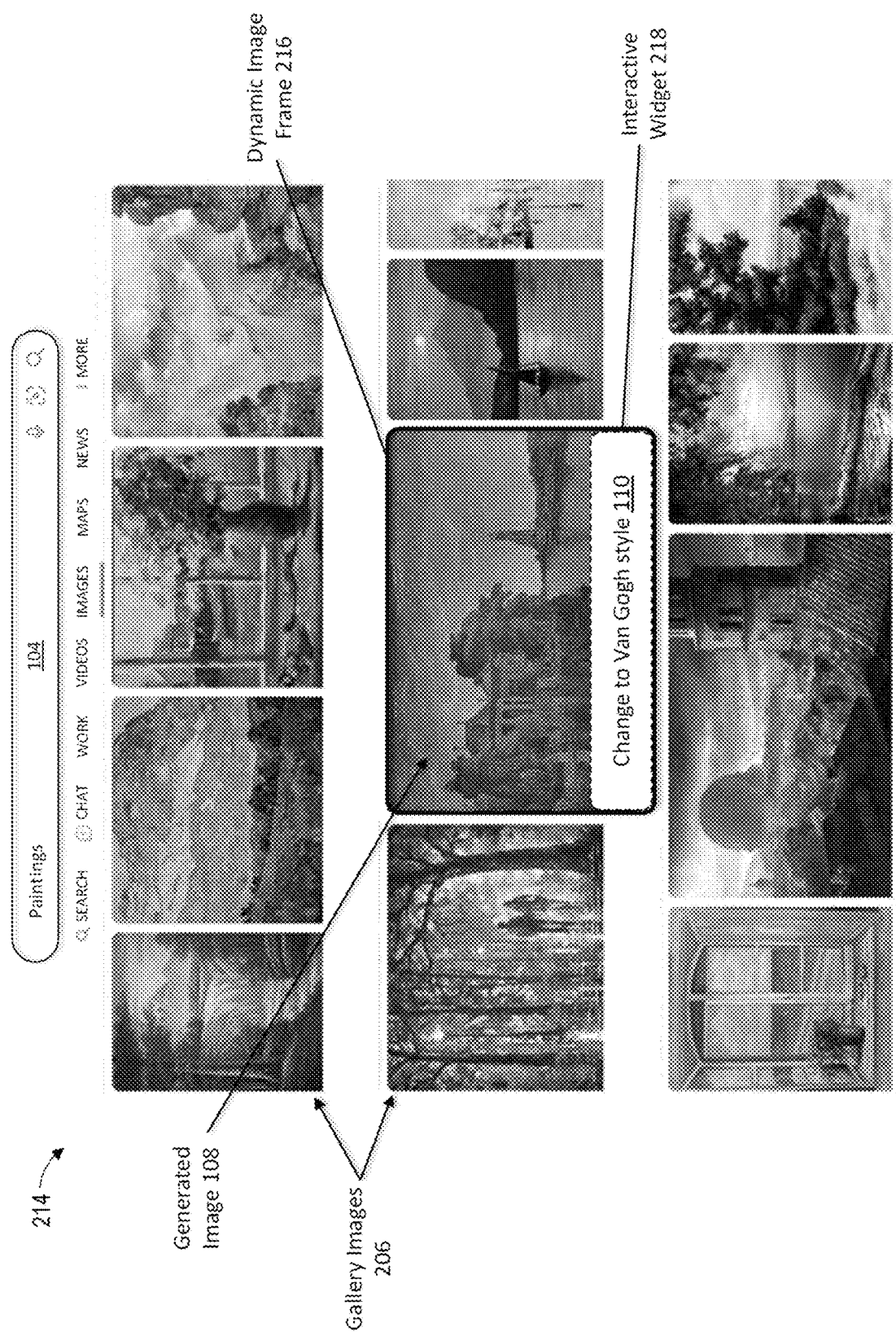
FIG. 5 depicts the example image gallery of FIG. 4 after a user interaction in accordance with one or more embodiments.

FIG. 5 depicts the example image gallery 214 of FIG. 4 after a user enters user input 110 into the interactive widget 218 in accordance with one or more embodiments of the present invention. As shown in FIG. 5, the generated image 108 in the dynamic image frame 216 has changed again, now to a new version of the painting re-worked in the style of Michelangelo. In some embodiments, the input 110 is provided to the controllable diffusion model 102 in combination with the image query 104 (refer to FIGS. 1 and 2). In some embodiments, the controllable diffusion model 102 creates the updated generated image 108 in response to receiving the input 110 via the interactive widget 218. As further shown in FIG. 5, the user input 110 has changed (now, to the string "Change to Van Gogh style").

Figure 6:
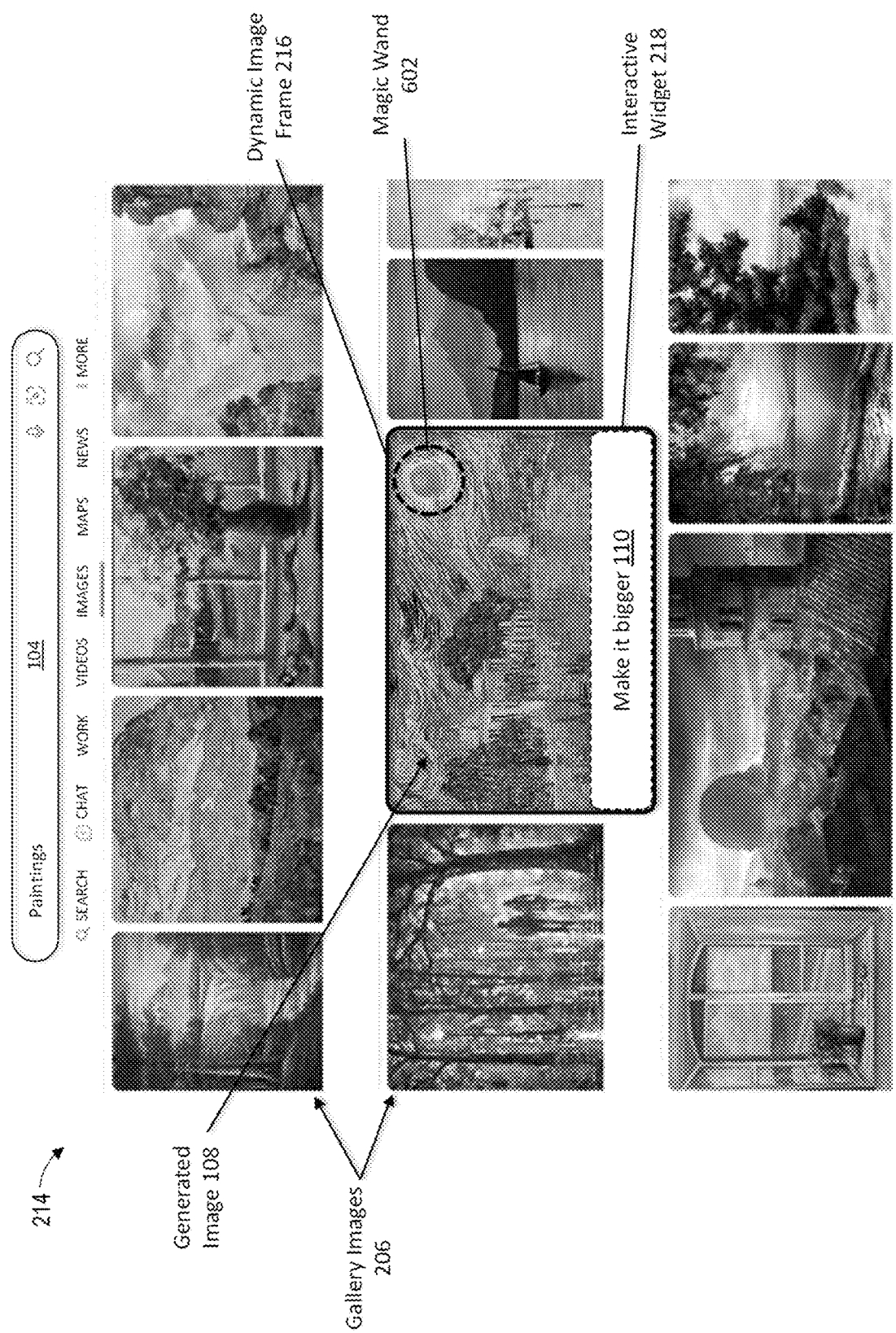
FIG. 6 depicts the example image gallery of FIG. 5 after a user interaction in accordance with one or more embodiments.

FIG. 6 depicts the example image gallery 214 of FIG. 5 after a user enters the new user input 110 into the interactive widget 218 in accordance with one or more embodiments of the present invention. As shown in FIG. 6, the generated image 108 in the dynamic image frame 216 has changed again, now to a new version of the painting re-worked in the style of Van Gogh (here, leveraging the style of the The Starry Night oil-on-canvas painting).

As further shown in FIG. 6, the user input 110 has changed (now, to the string "Make it bigger"). Moreover, the dynamic image frame 216 now includes a magic wand input 602 and/or other type of graphical tool for selecting or otherwise indicating specific features and/or regions in an image as described previously herein. In some embodiments, the magic wand input 602 and the user input 110 (which can include the magic wand input 602) work together to fully define an intent of a user. For example, the phrase "Make it bigger" is natively ambiguous as to which feature(s) of the generated image 108 are being referred to. However, in combination with the graphical selection, via the magic wand input 602, of the moon feature in the upper-right corner of the generated image 108, the intended feature is clear. Cooperation between multimodal inputs in the interactive widget 218 is not meant to particularly limited and other combinations are possible. For example, the interactive widget 218 might include a slider which, when combined with a selection of the moon via the magic wand input 602, can progressively and continuously increase or decrease the size of the moon (not separately shown).

Figure 7:
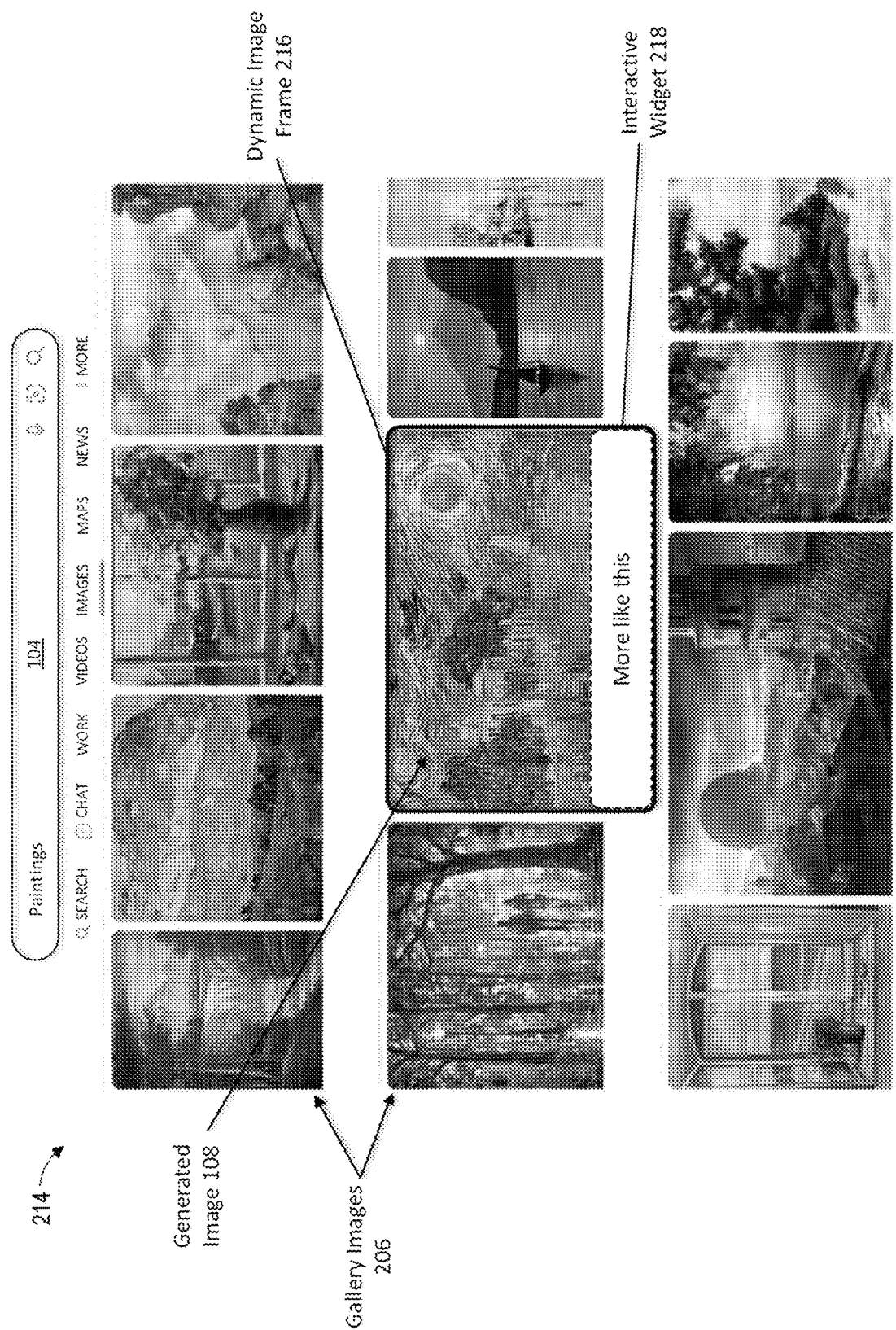
FIG. 7 depicts the example image gallery of FIG. 6 after a user interaction in accordance with one or more embodiments.

FIG. 7 depicts the example image gallery 214 of FIG. 6 after a user enters the new user input 110 and the magic wand input 602 into the interactive widget 218 in accordance with one or more embodiments of the present invention. As shown in FIG. 7, the generated image 108 in the dynamic image frame 216 has been fine-tuned. Observe that, while the painting remains largely unchanged (still in the style of Van Gogh's The Starry Night), the moon in the upper-right corner has been made larger.

As further shown in FIG. 7, the user input 110 has been replaced with new pre-generated text (here, "More like this"). In some embodiments, the image gallery recommendation service 202 can infer, due to the number of successive inputs and selections by the user, that the resultant fine-tuned generated image 108 of FIG. 7 is of particular interest to the respective user. In this manner, the image gallery recommendation service 202 can adjust the pre-generated text as a result of the continued user-system interactions. While omitted for clarity, selecting the "More like this" interactive widget 218 could result in changing the dynamic image frame 216 and/or any of the gallery images 206 to additional paintings made in the fine-tuned style of the generated image 108. For example, the new images could include various versions of the generated image 108 having different moon sizes.

Figure 8:
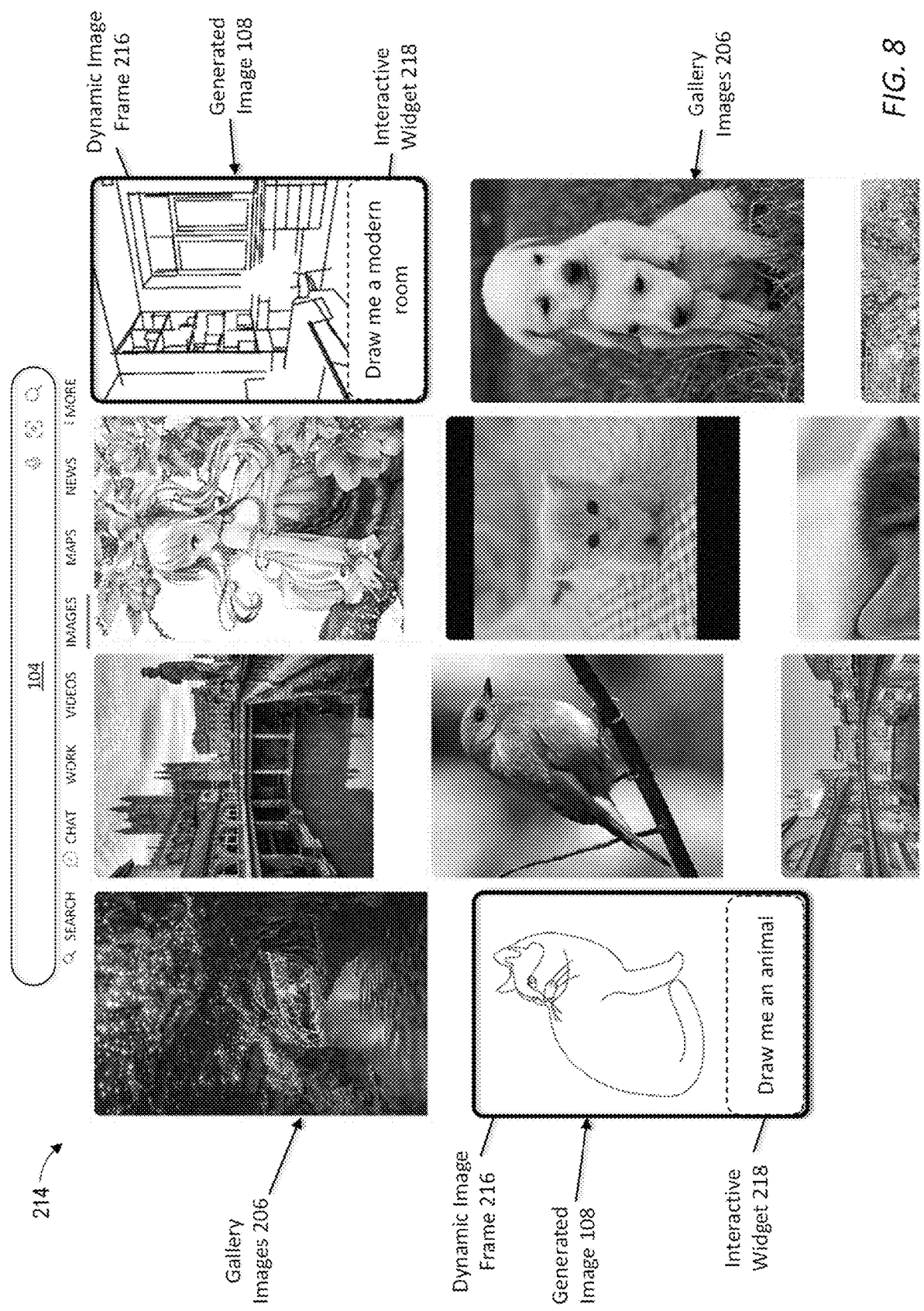
FIG. 8 depicts an example image gallery in accordance with one or more embodiments.

FIG. 8 depicts an example image gallery 214 in accordance with one or more embodiments of the present invention. The image gallery 214 can be presented to a user in a user interface (e.g., the user interface 212 in FIG. 2) in a similar manner as discussed with respect to FIGS. 3 to 7. In contrast to the image gallery 214 shown in FIG. 3, however, the image query 104 is blank. This can occur, for example, when a user initially accesses the image gallery recommendation service 202 (via, e.g., the "IMAGES" icon below the image query 104). This can also occur during an interaction with the image gallery recommendation service 202.

In any case, observe that the image gallery 214 can still include one or more gallery images 206 (here, a collection of various images such as a bird, a city, artwork, etc.) and one or more dynamic image frames 216. The one or more dynamic image frames 216 include for example, a sketch of a cat and a sketch of a room. In scenarios where the image gallery recommendation service 202 does not have the benefit of the image query 104, image recommendations can still be made using available information relating to the user. In some embodiments, the user can be identified via a user session identifier (ID), device ID, account ID, etc. Once identified, the gallery images 206 are populated from a database (e.g., image database 210) based on known and/or inferred information relating to the user.

Note that, as used herein, the term "identified user" does not necessarily imply a strict identification of an individual, but instead can mean the relative identification of various characteristics of the user (i.e., non-personally identifiable information) that are otherwise instructive of the types of images the user might be interested in. For example, in some embodiments, the image gallery recommendation service 202 can recommend one or more gallery images 206 and one or more generated images 108 based on available, identifying and/or non-identifying information of the user. User information can include, for example, the user's search history, the user's previously indicated preferences (i.e., prior image selections and prompts), the user's location/country (inferred, e.g., via metrics tied to the client device 204 and/or a network used to access the image gallery recommendation service 202), the user's preferred language, and/or various other usage metrics (what types of images does the user typically save, like, share, etc.).

In some embodiments, the image gallery recommendation service 202 can score each image from a pool of available images for the initial population of the image gallery 214. In some embodiments, the image gallery recommendation service 202 can select any number of the highest scoring images for the gallery images 206. Images can be scored according to any predetermined criteria, such as by a matching metric (e.g., distance measure) to one or more characteristics of the user. The use of distance measures for qualifying matches between object features is known and any suitable process can be used (e.g., Euclidean distance, Tanimoto distance, Jaccard similarity coefficients, etc.). For example, the image gallery recommendation service 202 might score highly an image of a bird for a user known to have a preference for animals and might provide a lower score to a picture of a construction site. Other predetermined criteria are possible, such as scoring images in whole or in part according to commercial metrics. For example, the image gallery recommendation service 202 might score highly an image associated with an advertising partner and/or an image having a relatively high impression profitability and might provide a lower score to a picture associated with a market competitor and/or an image having a relatively low impression profitability.

Figure 9:
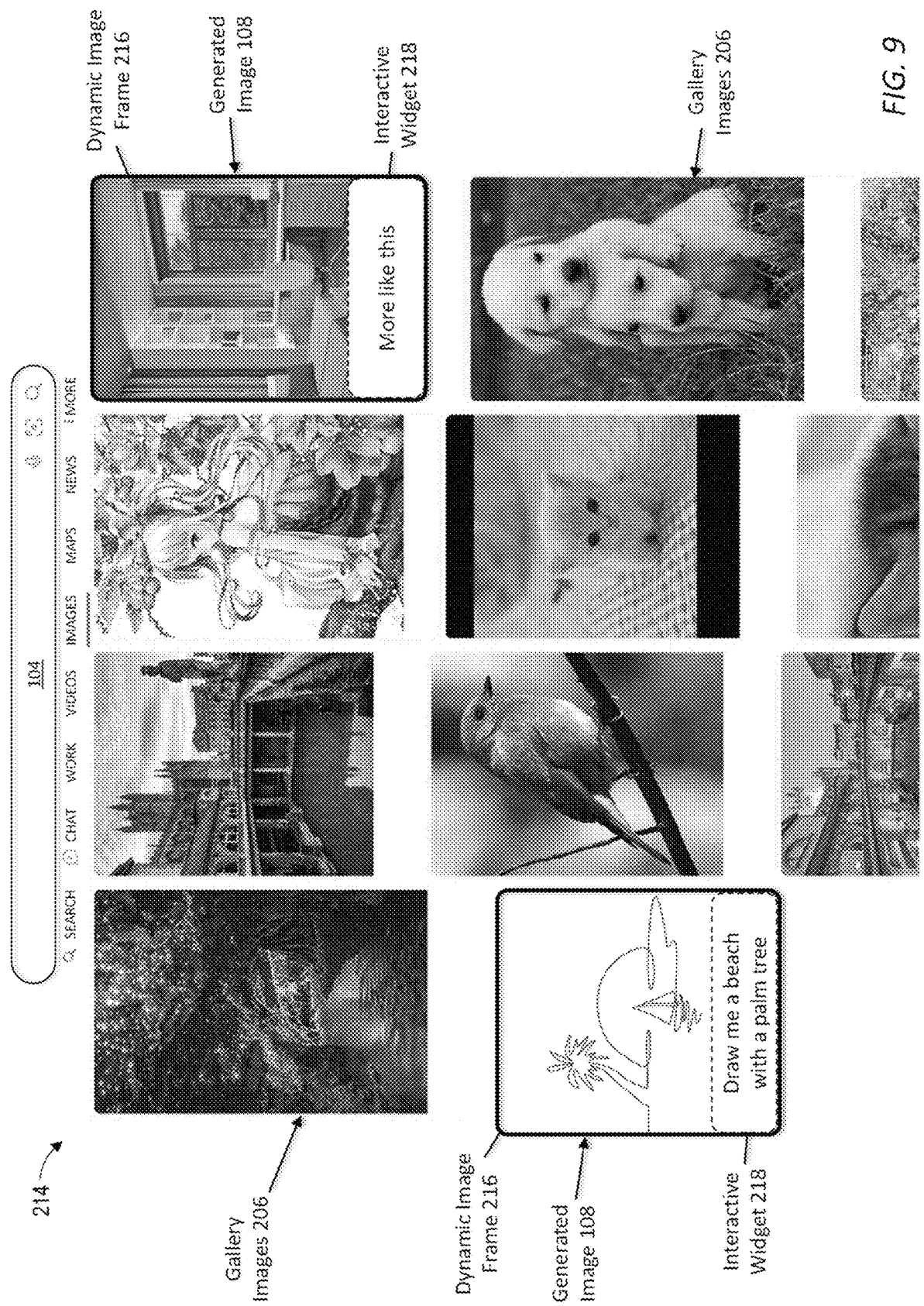
FIG. 9 depicts the example image gallery of FIG. 8 after a user interaction in accordance with one or more embodiments.

FIG. 9 depicts the example image gallery 214 of FIG. 8 after a user selects the interactive widget 218 for "Draw me a modern room" in accordance with one or more embodiments of the present invention. As shown in FIG. 9, the generated image 108 in the top-right dynamic image frame 216 has been changed to a new, dynamically generated drawing of a modern room. In some embodiments, the new, dynamically generated drawing of a modern room includes a more fully fleshed out image based on the earlier drawing sketch. Observe that the new drawing of a modern room still includes a bookshelf, bed, desk, and chair, but additional details, textures, and elements have been added to provide a more finished appearance reassembling that of an actual room.

Moreover, observe that the generated image 108 in the bottom-left dynamic image frame 216 has also changed. This generated image 108 now shows a island scene with a sailboat and sunset (the cat sketch has been replaced). In some embodiments, the image gallery recommendation service 202 can infer that the user was not as interested in generating images of animals (the other option presented in FIG. 8) as the user decided, instead, to interact with the interactive widget 218 having the modern room sketch.

In some embodiments, the image gallery recommendation service 202 can change one or more generated images 108 in one or more dynamic image frames 216 to new sketches having new prompts (here, "draw me a beach with a palm tree"). In some embodiments, the new prompt(s)/image(s) can include the next best guess (e.g., next highest score) for an image(s) of probable interest to the user. In some embodiments, the image gallery recommendation service 202 can update any estimates/scores for based on the user interactions. For example, the image gallery recommendation service 202 might lower the scores of images having animals in view of the user ignore that option in the previous interaction. Note that, in some circumstances, the new generated image 108 for the dynamic image frame 216 might not have the same dimensions (height, width) as the prior image. In some embodiments, the image gallery recommendation service 202 can dynamically resize the dynamic image frame 216 to accommodate changes in the size of the respective generated image 108 (as shown).

Figure 10:
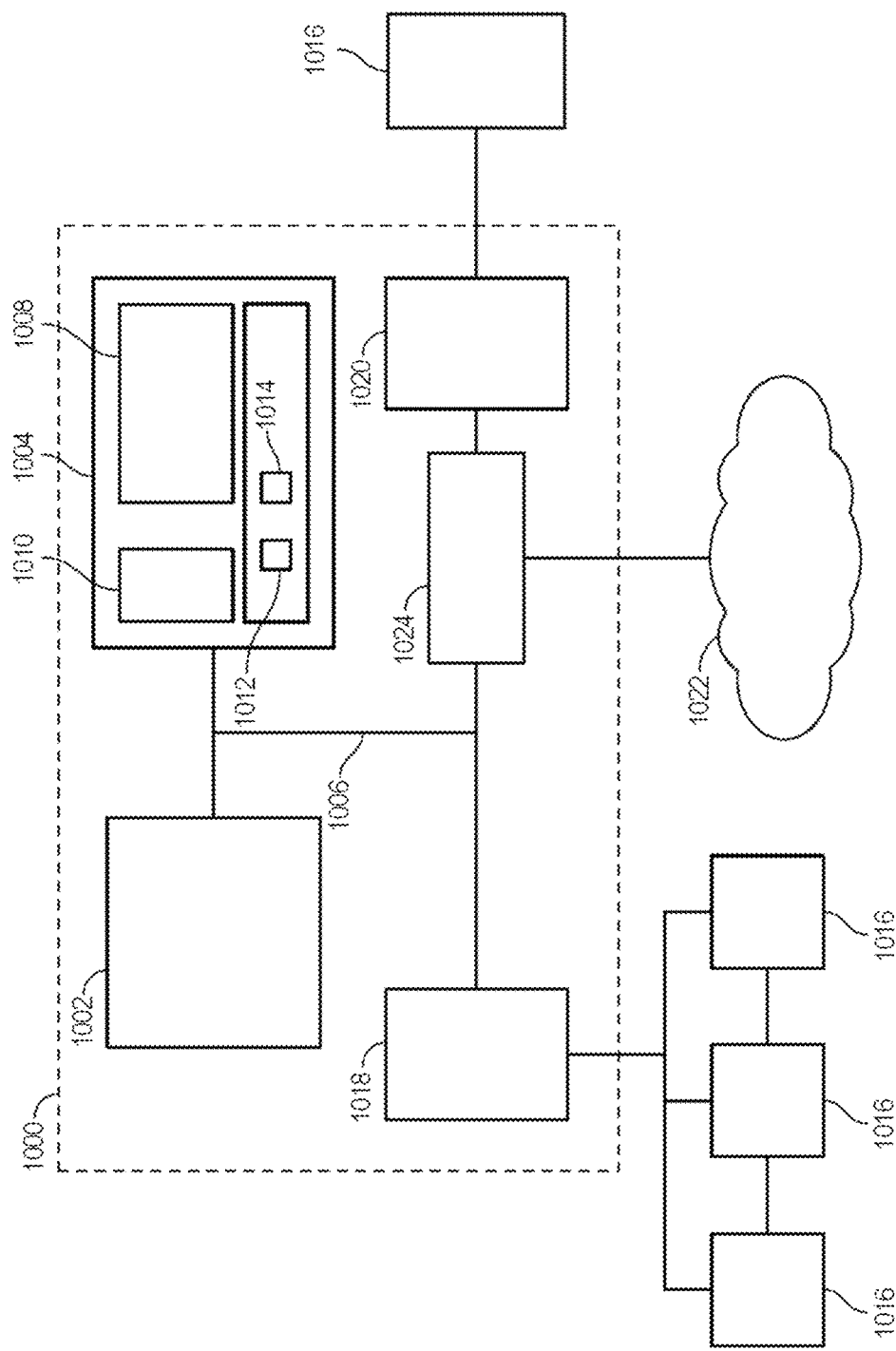
FIG. 10 depicts a block diagram of a computer system according to one or more embodiments.

FIG. 10 illustrates aspects of an embodiment of a computer system 1000 that can perform various aspects of embodiments described herein. In some embodiments, the computer system(s) 1000 can implement and/or otherwise be incorporated within or in combination with any of the workflows, processes, systems, and services (e.g., the image gallery recommendation service 202) described previously herein. In some embodiments, a computer system 1000 can be implemented client-side. For example, a computer system 1000 can be configured to display and carry out the functionality of the user interface 212. In some embodiments, a computer system 1000 can be implemented server-side. For example, a computer system 1000 can be configured to receive an image query 104 and/or user input 110 and to provide, in response, a generated image 108 and/or gallery images 206.

The computer system 1000 includes at least one processing device 1002, which generally includes one or more processors or processing units for performing a variety of functions, such as, for example, completing any portion of the dynamic image search workflow described previously with respect to FIGS. 1 to 9. Components of the computer system 1000 also include a system memory 1004, and a bus 1006 that couples various system components including the system memory 1004 to the processing device 1002. The system memory 1004 may include a variety of computer system readable media. Such media can be any available media that is accessible by the processing device 1002, and includes both volatile and non-volatile media, and removable and non-removable media. For example, the system memory 1004 includes a non-volatile memory 1008 such as a hard drive, and may also include a volatile memory 1010, such as random access memory (RAM) and/or cache memory. The computer system 1000 can further include other removable/non-removable, volatile/non-volatile computer system storage media.

The system memory 1004 can include at least one program product having a set (e.g., at least one) of program modules that are configured to carry out functions of the embodiments described herein. For example, the system memory 1004 stores various program modules that generally carry out the functions and/or methodologies of embodiments described herein. A module or modules 1012, 1014 may be included to perform functions related to the dynamic image search described previously herein. The computer system 1000 is not so limited, as other modules may be included depending on the desired functionality of the computer system 1000. As used herein, the term "module" refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

The processing device 1002 can also be configured to communicate with one or more external devices 1016 such as, for example, a keyboard, a pointing device, and/or any devices (e.g., a network card, a modem, etc.) that enable the processing device 1002 to communicate with one or more other computing devices (e.g., the client device 204 and/or the image gallery recommendation service 202). Communication with various devices can occur via Input/Output (I/O) interfaces 1018 and 1020.

The processing device 1002 may also communicate with one or more networks 1022 such as a local area network (LAN), a general wide area network (WAN), a bus network and/or a public network (e.g., the Internet) via a network adapter 1024. In some embodiments, the network adapter 1024 is or includes an optical network adaptor for communication over an optical network. It should be understood that although not shown, other hardware and/or software components may be used in conjunction with the computer system 1000. Examples include, but are not limited to, microcode, device drivers, redundant processing units, external disk drive arrays, RAID systems, and data archival storage systems, etc.

Figure 11:
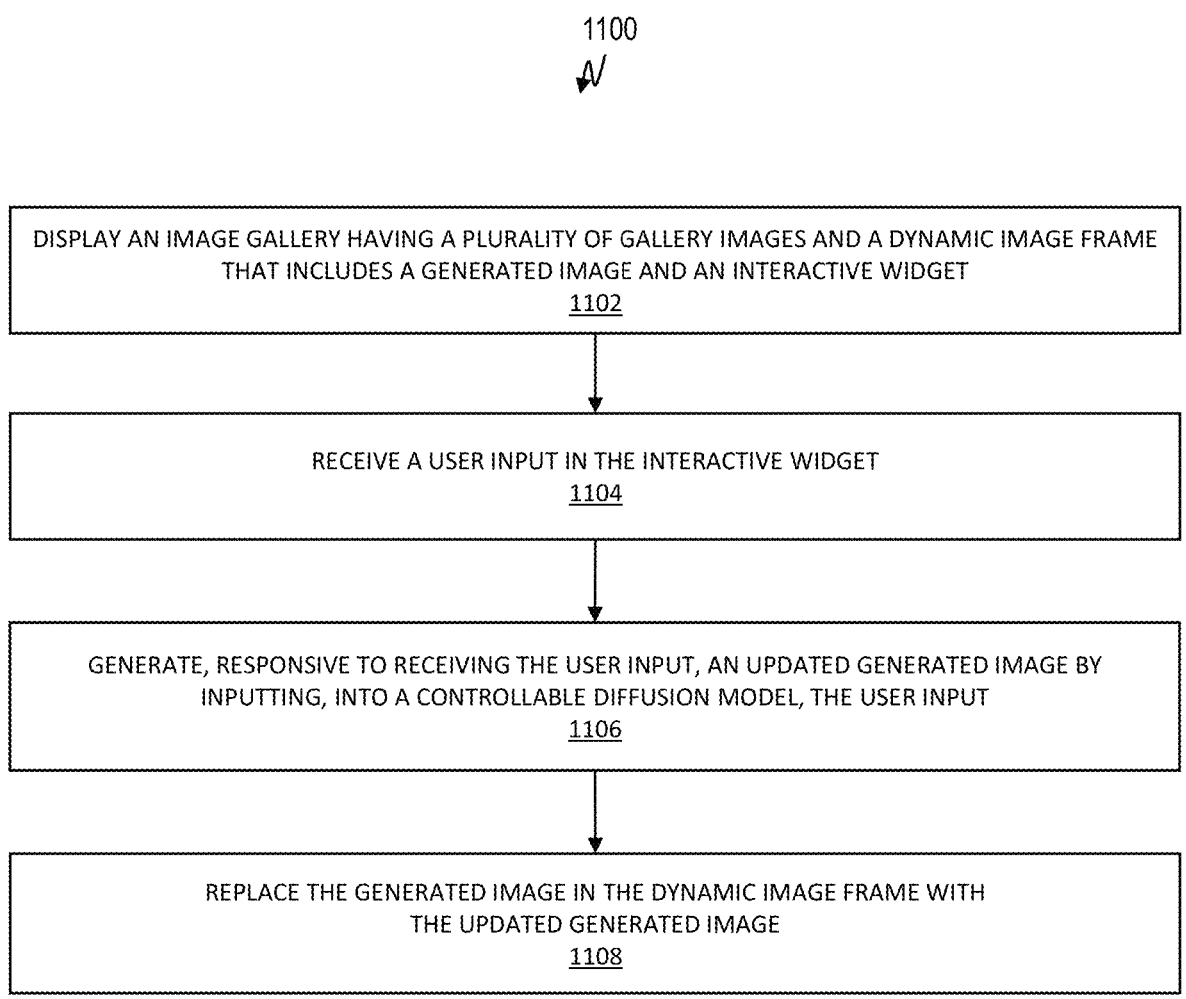
FIG. 11 depicts a flowchart of a method for leveraging a controllable diffusion model for dynamic image search within an image gallery recommendation service in accordance with one or more embodiments.

Referring now to FIG. 11, a flowchart 1100 for leveraging a controllable diffusion model for dynamic image search within an image gallery recommendation service is generally shown according to an embodiment. The flowchart 1100 is described with reference to FIGS. 1 to 10 and may include additional steps not depicted in FIG. 11. Although depicted in a particular order, the blocks depicted in FIG. 11 can be, in some embodiments, rearranged, subdivided, and/or combined.

At block 1102, the method includes displaying an image gallery having a plurality of gallery images. The image gallery further includes a dynamic image frame having a generated image and an interactive widget.

At block 1104, the method includes receiving a user input in the interactive widget.

At block 1106, the method includes generating, responsive to receiving the user input, an updated generated image by inputting, into a controllable diffusion model, the user input.

At block 1108, the method includes replacing the generated image in the dynamic image frame with the updated generated image.

In some embodiments, the method includes receiving an image query in a field of the image gallery. In some embodiments, the generated image is generated by inputting, into the controllable diffusion model, the image query. In some embodiments, the plurality of gallery images and the generated image are selected according to a degree of matching to one or more features in the image query.

In some embodiments, the method includes determining one or more constraints in the image query. In some embodiments, the generated image is generated by inputting, into the controllable diffusion model, the one or more constraints.

In some embodiments, the one or more constraints in the image query include at least one of a pose skeleton and an object boundary. In some embodiments, determining the one or more constraints includes extracting the object boundary when a feature in the image query is one of a structure and a geological feature. In some embodiments, determining the one or more constraints includes extracting the pose skeleton when a feature in the image query is one of a person and an animal.

In some embodiments, the plurality of gallery images are sourced from an image database. In some embodiments, one or more of the plurality of gallery images are not generated images (i.e., are sourced images rather than dynamically generated images from a diffusion model). In some embodiments, one or more of the plurality of gallery images are previously generated images.

In some embodiments, the interactive widget includes a text field. In some embodiments, receiving the user input in the interactive widget includes receiving a text string input into the text field.

In some embodiments, the interactive widget includes one or more of a dropdown menu, a checkbox, a slider, a color picker, a canvas interface for drawing or sketching, and a rating button.

In some embodiments, the interactive widget includes a canvas for magic wand inputs. In some embodiments, receiving the user input in the interactive widget includes receiving a magic wand input graphically selecting one of a specific feature and a specific region in the generated image. In some embodiments, the interactive widget further includes a text field. In some embodiments, receiving the user input in the interactive widget further includes receiving a text string input having contextual information for the magic wand input.

While the disclosure has been described with reference to various embodiments, it will be understood by those skilled in the art that changes may be made and equivalents may be substituted for elements thereof without departing from its scope. The various tasks and process steps described herein can be incorporated into a more comprehensive procedure or process having additional steps or functionality not described in detail herein. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

Unless defined otherwise, technical and scientific terms used herein have the same meaning as is commonly understood by one of skill in the art to which this disclosure belongs.

Various embodiments of the invention are described herein with reference to the related drawings. The drawings depicted herein are illustrative. There can be many variations to the diagrams and/or the steps (or operations) described therein without departing from the spirit of the disclosure. For instance, the actions can be performed in a differing order or actions can be added, deleted or modified. All of these variations are considered a part of the present disclosure.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof. The term "or" means "and/or" unless clearly indicated otherwise by context.

The terms "received from", "receiving from", "passed to", "passing to", etc. describe a communication path between two elements and does not imply a direct connection between the elements with no intervening elements/connections therebetween unless specified. A respective communication path can be a direct or indirect communication path.

The corresponding structures, materials, acts, and equivalents of all means or step plus function elements in the claims below are intended to include any structure, material, or act for performing the function in combination with other claimed elements as specifically claimed.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

The present invention may be a system, a method, and/or a computer program product at any possible technical detail level of integration. The computer program product may include a computer readable storage medium (or media) having computer readable program instructions thereon for causing a processor to carry out aspects of the present invention.

Various embodiments are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments described herein have been presented for purposes of illustration, but are not intended to be exhaustive or limited to the form(s) disclosed. The embodiments were chosen and described in order to best explain the principles of the disclosure. Many modifications and variations will be apparent to those of ordinary skill in the art without departing from the scope and spirit of the described embodiments. The terminology used herein was chosen to best explain the principles of the various embodiments, the practical application or technical improvement over technologies found in the marketplace, or to enable others of ordinary skill in the art to understand the embodiments described herein.

What is claimed is:

1. A method comprising:
causing display of an image gallery comprising a plurality of gallery images, the plurality of gallery images comprising a collection of images matching an image query, the plurality of gallery images stored in an image database prior to receiving the image query, the image gallery further comprising a dynamic image frame comprising a generated image that is dynamically created in response to receiving the image query and an interactive widget for modifying the generated image, the plurality of gallery images and the generated image displayed concurrently in the image gallery;
the interactive widget including generated text corresponding to a topic of interest identified for the image query according to a topic recognition and constraint mapping applied to the image query;
receiving a user input in the interactive widget for modifying the generated image;
generating, responsive to receiving the user input, an updated generated image by inputting, into a controllable diffusion model, the user input;
replacing the generated image in the dynamic image frame with the updated generated image;
replacing, responsive to successive user inputs to modify the generated image, one or more of the plurality of gallery images that matched the image query with new gallery images selected according to learned characteristics of the updated generated image, the learned characteristics determined from the successive user inputs; and
replacing the user input with updated generated text corresponding to the updated generated image.

2. The method of claim 1, further comprising receiving an image query in a field of the image gallery.

3. The method of claim 2, wherein the generated image is generated by inputting, into the controllable diffusion model, the image query.

4. The method of claim 2, wherein the plurality of gallery images and the generated image are selected according to a degree of matching to one or more features in the image query.

5. The method of claim 2, further comprising determining one or more constraints in the image query.

6. The method of claim 5, wherein the generated image is generated by inputting, into the controllable diffusion model, the one or more constraints.

7. The method of claim 5, wherein the one or more constraints in the image query comprise at least one of a pose skeleton and an object boundary.

8. The method of claim 7, wherein determining the one or more constraints comprises extracting the object boundary when a feature in the image query comprises one of a structure and a geological feature.

9. The method of claim 7, wherein determining the one or more constraints comprises extracting the pose skeleton when a feature in the image query comprises one of a person and an animal.

10. The method of claim 1, wherein the plurality of gallery images are sourced from an image database.

11. The method of claim 1, wherein the interactive widget comprises a text field, and receiving the user input in the interactive widget comprises receiving a text string input into the text field.

12. The method of claim 1, wherein the interactive widget comprises one or more of a dropdown menu, a checkbox, a slider, a color picker, a canvas interface for drawing or sketching, and a rating button.

13. The method of claim 1, wherein the interactive widget comprises a canvas for magic wand inputs, and receiving the user input in the interactive widget comprises receiving a magic wand input graphically selecting one of a specific feature and a specific region in the generated image.

14. The method of claim 13, wherein the interactive widget further comprises a text field, and receiving the user input in the interactive widget further comprises receiving a text string input having contextual information for the magic wand input.

15. A system having a memory, computer readable instructions, and one or more processors for executing the computer readable instructions, the computer readable instructions controlling the one or more processors to perform operations comprising:
receiving, from a client device communicatively coupled to the system, an image query;
providing, to the client device, a plurality of gallery images and a generated image according to a degree of matching to one or more features in the image query, the plurality of gallery images comprising a collection of images stored in an image database prior to receiving the image query, the generated image dynamically created in response to receiving the image query, the plurality of gallery images and the generated image displayed concurrently in an image gallery;
receiving, from an interactive widget of the client device, a user input for modifying the generated image, the interactive widget including generated text corresponding to a topic of interest identified for the image query according to a topic recognition and constraint mapping applied to the image query;
generating, responsive to the user input, an updated generated image by inputting, into a controllable diffusion model, the user input;
replacing, responsive to successive user inputs to modify the generated image, one or more of the plurality of gallery images that matched the image query with new gallery images selected according to learned characteristics of the updated generated image, the learned characteristics determined from the successive user inputs;
replacing the user input with updated generated text corresponding to the updated generated image; and
providing, to the client device, the updated generated image.

16. The system of claim 15, wherein the generated image is generated by inputting, into the controllable diffusion model, the image query.

17. The system of claim 15, further comprising determining one or more constraints in the image query.

18. The system of claim 17, wherein the generated image is generated by inputting, into the controllable diffusion model, the one or more constraints.

19. A system having a memory, computer readable instructions, and one or more processors for executing the computer readable instructions, the computer readable instructions controlling the one or more processors to perform operations comprising:

receiving, from an image gallery recommendation service communicatively coupled to the system, a plurality of gallery images and a generated image, the plurality of gallery images comprising a collection of images stored in an image database prior to receiving an image query, the generated image dynamically created in response to receiving the image query;

displaying an image gallery comprising the plurality of gallery images and a dynamic image frame comprising the generated image and an interactive widget, the plurality of gallery images and the generated image displayed concurrently in the image gallery;

the interactive widget including generated text corresponding to a topic of interest identified for the image query according to a topic recognition and constraint mapping applied to the image query;

receiving a user input in the interactive widget for modifying the generated image;

transmitting the user input to the image gallery recommendation service;

receiving, from the image gallery recommendation service, an updated generated image;

replacing the generated image in the dynamic image frame with the updated generated image;

receiving, from the image gallery recommendation service, new gallery images matching the updated generated image;

replacing, responsive to successive user inputs to modify the generated image, one or more of the plurality of gallery images that matched the image query with new gallery images selected according to learned characteristics of the updated generated image, the learned characteristics determined from the successive user inputs; and replacing the user input with updated generated text corresponding to the updated generated image.

20. The system of claim 19, wherein the interactive widget comprises a text field, and receiving the user input in the interactive widget comprises receiving a text string input into the text field.

* * * * *